US011222339B2

(12) United States Patent
Camenares et al.

(10) Patent No.: US 11,222,339 B2
(45) Date of Patent: Jan. 11, 2022

(54) COMPUTER-BASED SYSTEMS AND METHODS CONFIGURED FOR ONE OR MORE TECHNOLOGICAL APPLICATIONS FOR AUTHORIZING A CREDIT CARD FOR USE BY A USER

(71) Applicant: Capital One Services, LLC, McLean, VA (US)

(72) Inventors: Christopher Camenares, McLean, VA (US); Joseph Boayue, McLean, VA (US); Ana Cruz, McLean, VA (US); Lee Adcock, McLean, VA (US); Nahid Farhady Ghalaty, McLean, VA (US); Vincent Pham, Champaign, IL (US); Geeta Shyamala, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/717,557

(22) Filed: Dec. 17, 2019

(65) Prior Publication Data
US 2021/0182853 A1    Jun. 17, 2021

(51) Int. Cl.
*G06Q 20/40* (2012.01)
*G06Q 20/32* (2012.01)
*G06Q 20/38* (2012.01)

(52) U.S. Cl.
CPC ....... *G06Q 20/4016* (2013.01); *G06Q 20/322* (2013.01); *G06Q 20/382* (2013.01);
(Continued)

(58) Field of Classification Search
CPC .... G06Q 20/341; G06Q 20/12; G06Q 20/206; G06Q 20/401; G06Q 40/00; G06Q 20/40; G06Q 20/4016
(Continued)

(56) References Cited

U.S. PATENT DOCUMENTS 7,360,688 B1 * 4/2008 Harris ................. G06K 7/0021
235/380
7,588,180 B1 * 9/2009 Carmichael ........ G06K 7/10079
235/379
(Continued)

FOREIGN PATENT DOCUMENTS

CA         2990227 A1 *  6/2018  ....... G06K 19/07754
WO    WO-0062262 A1 * 10/2000  ......... G06Q 20/2295

*Primary Examiner* — Kelly S. Campen
(74) *Attorney, Agent, or Firm* — Greenberg Traurig, LLP

(57) ABSTRACT

A configured application for authorizing a credit card by a user and a method that may include receiving an electronic request to pair a mobile device associated with a user with a credit card of the user. The credit card may include a location tracking circuitry to remotely communicate a location of the credit card to a remote electronic recipient. The location of the credit card may be received by a processor from the remote electronic recipient. A proximity multi-factor authentication may verify that the user is an authorized user of the credit card. The mobile device associated with the user may be paired with the credit card of the user after verifying that the user is the authorized user. The processor may receive the location of the credit card paired with the mobile device from the remote electronic recipient. The location of the credit card may be displayed on a display of the mobile device associated with the user.

20 Claims, 9 Drawing Sheets

(52) U.S. Cl.
CPC ............ *G06Q 20/40* (2013.01); *G06Q 20/401* (2013.01); *G06Q 20/3263* (2020.05); *G06Q 20/4015* (2020.05)

(58) Field of Classification Search
USPC ...................... 235/380, 379, 375; 705/35, 44
See application file for complete search history.

(56) References Cited

U.S. PATENT DOCUMENTS

| | | | | |
|---|---|---|---|---|
| 9,363,635 | B2* | 6/2016 | Finlow-Bates | H04W 4/80 |
| 9,569,163 | B2* | 2/2017 | Gai | H04W 4/21 |
| 9,571,956 | B2* | 2/2017 | Gai | G06F 3/041 |
| 9,576,283 | B2* | 2/2017 | Argue | G07F 17/42 |
| 9,578,481 | B2* | 2/2017 | Gai | G06F 3/03547 |
| 9,877,193 | B2* | 1/2018 | Li | H04L 41/28 |
| 10,019,707 | B1* | 7/2018 | Sangi | G06Q 20/3224 |
| 10,062,263 | B1* | 8/2018 | Mandali | G08B 25/005 |
| 10,366,378 | B1* | 7/2019 | Han | G06Q 20/202 |
| 10,405,181 | B2* | 9/2019 | Li | H04L 63/083 |
| 10,410,076 | B2* | 9/2019 | Van Os | G06K 9/00288 |
| 10,757,574 | B1* | 8/2020 | Rule | H04L 63/0838 |
| 2009/0260064 | A1* | 10/2009 | McDowell | G06F 21/10 726/4 |
| 2011/0202466 | A1* | 8/2011 | Carter | G06Q 20/3224 705/67 |
| 2012/0214548 | A1* | 8/2012 | Pan | G06Q 20/34 455/558 |
| 2013/0111555 | A1* | 5/2013 | Leneel | G06F 21/34 726/4 |
| 2014/0058861 | A1* | 2/2014 | Argue | G07F 17/42 705/18 |
| 2014/0122337 | A1* | 5/2014 | Kang | G06Q 20/38 705/44 |
| 2014/0128095 | A1* | 5/2014 | Finlow-Bates | H04L 67/26 455/456.1 |
| 2015/0278795 | A1* | 10/2015 | Jiang | G06Q 20/3829 705/44 |
| 2015/0334519 | A1* | 11/2015 | Gai | G06F 3/041 455/41.2 |
| 2016/0007174 | A1* | 1/2016 | Gai | G06F 3/03547 345/173 |
| 2016/0054973 | A1* | 2/2016 | Gai | H04W 4/21 345/173 |
| 2016/0065558 | A1* | 3/2016 | Suresh | H04L 63/08 726/7 |
| 2017/0011401 | A1* | 1/2017 | Steinlicht | H04W 4/029 |
| 2017/0032370 | A1* | 2/2017 | Beltramino | G06Q 20/38215 |
| 2017/0109620 | A1* | 4/2017 | Wurmfeld | G06K 19/02 |
| 2017/0154328 | A1* | 6/2017 | Zarakas | G06Q 20/204 |
| 2017/0249634 | A1* | 8/2017 | Cage | G06Q 20/3278 |
| 2018/0158048 | A1* | 6/2018 | Narasimhan | G06Q 20/363 |
| 2019/0188686 | A1* | 6/2019 | Sangi | G06K 19/0712 |
| 2019/0279486 | A1* | 9/2019 | Mandali | G08B 25/005 |
| 2019/0370583 | A1* | 12/2019 | Van Os | H04N 5/23293 |
| 2019/0385147 | A1* | 12/2019 | Sangi | G06Q 20/341 |
| 2020/0053056 | A1* | 2/2020 | Mathias | H04L 9/0894 |
| 2021/0012340 | A1* | 1/2021 | Kapur | G06Q 20/4037 |

* cited by examiner

COMPUTER-BASED SYSTEMS AND METHODS CONFIGURED FOR ONE OR MORE TECHNOLOGICAL APPLICATIONS FOR AUTHORIZING A CREDIT CARD FOR USE BY A USER

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to improved computer-based platforms/systems, improved computing devices/components and/or improved computing objects configured for one or more novel technological applications for authorizing a credit card for use by a user.

BACKGROUND OF TECHNOLOGY

A computer network platform/system may include a group of computers (e.g., clients, servers, smart routers (e.g., trading smart routers)) and other computing hardware devices that are linked together through one or more communication channels to facilitate communication and/or resource-sharing, via one or more specifically programmed graphical user interfaces (GUIs) of the present disclosure, among a wide range of users.

SUMMARY OF DESCRIBED SUBJECT MATTER

In some embodiments, the present disclosure provides an exemplary technically improved computer-based method that may include at least the following steps of:
receiving, by a processor, an electronic request to pair a mobile device associated with a user with a credit card of the user, where the credit card may include a location tracking circuitry that is configured to remotely communicate a location of the credit card to a remote electronic recipient;
receiving, by the processor, the location of the credit card from the remote electronic recipient;
utilizing, by the processor, a proximity multi-factor authentication to verify that the user is an authorized user of the credit card;
causing, by the processor, to pair the mobile device associated with the user with the credit card of the user after verifying that the user is the authorized user of the credit card;
receiving, by the processor, the location of the credit card paired with the mobile device from the remote electronic recipient;
causing, by the processor, to display the location of the credit card on a display of the mobile device associated with the user;
determining, by the processor, whether the location of the credit card is outside of a predefined geographical area; and
deactivating, by the processor, the credit card for use when the location of the credit card is outside of the predefined geographical area.

In some embodiments, the present disclosure provides an exemplary technically improved computer-based system that includes at least the following components of a memory and at least one processor, where the at least one processor may be configured to:
receive an electronic request to pair a mobile device associated with a user with a credit card of the user, wherein the credit card comprises a location tracking circuitry that is configured to remotely communicate a location of the credit card to a remote electronic recipient,
receive the location of the credit card from the remote electronic recipient,
utilize a proximity multi-factor authentication to verify that the user is an authorized user of the credit card,
cause to pair the mobile device associated with the user with the credit card of the user after verifying that the user is the authorized user of the credit card,
receive the location of the credit card paired with the mobile device from the remote electronic recipient,
cause to display the location of the credit card on a display of the mobile device associated with the user,
determine whether the location of the credit card is outside of a predefined geographical area, and
deactivate the credit card for use when the location of the credit card is outside of the predefined geographical area.

In some embodiments, the present disclosure provides an exemplary technically improved computer-based apparatus that includes at least the following components of a credit card which may include a processor and location tracking circuitry configured to remotely communicate a location of the credit card of a user to a remote electronic recipient. The processor may be configured to:
send an electronic request to pair with a mobile device,
utilize a proximity multi-factor authentication to verify that the user of the mobile device is an authorized user of the mobile device,
cause to pair the credit card of the user with the mobile device of the user after verifying that the user is the authorized user of the mobile device,
determine whether the location of the credit card is outside of a predefined geographical area, and
deactivate the credit card for use when the location of the credit card is outside of the predefined geographical area.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
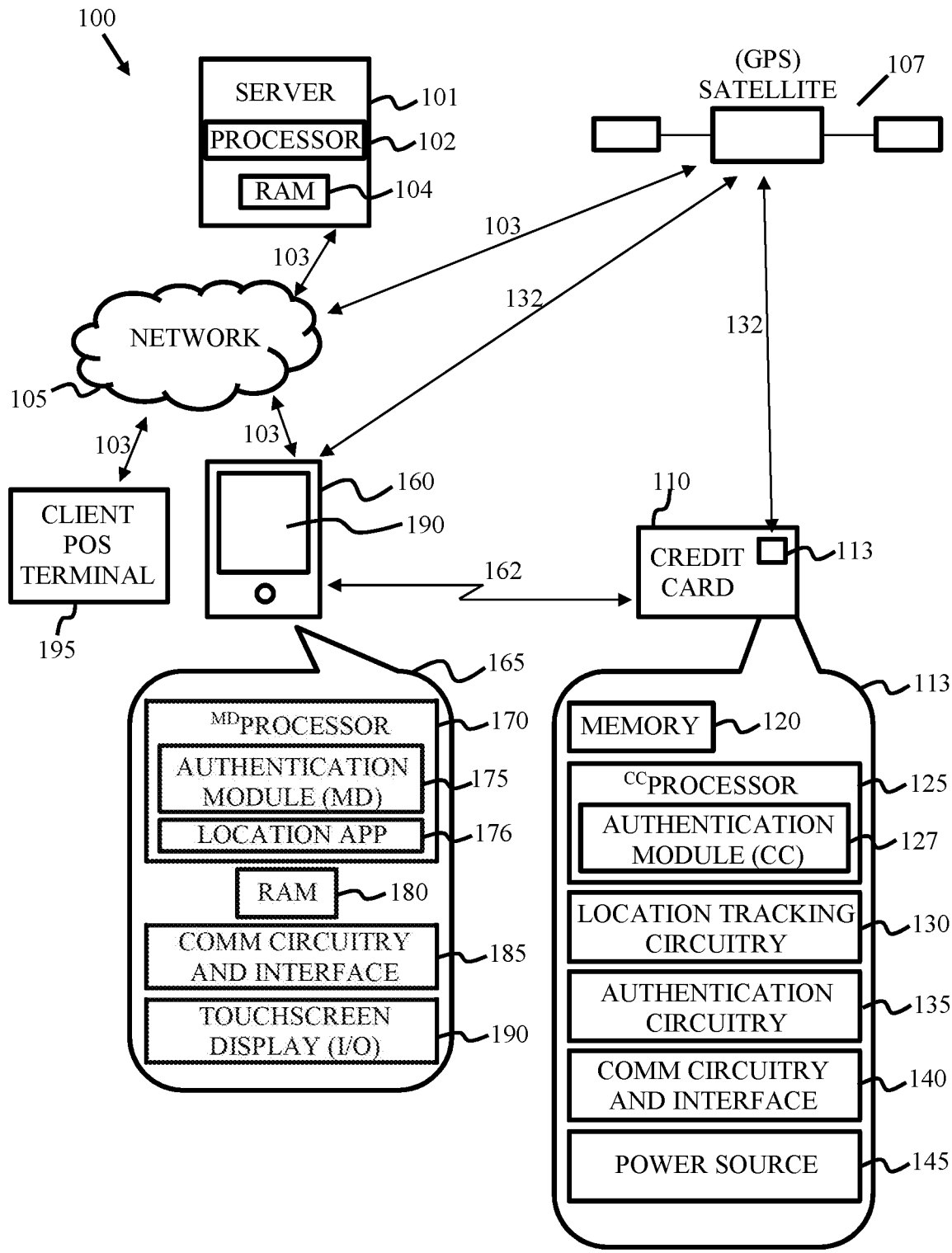
FIG. 1 depicts an exemplary system for authorizing a use of a credit card by a user, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

Embodiments of the present disclosure herein describe systems and methods for authorizing a credit card for use by a user based on proximity multi-factor authentication (MFA) schemes when pairing the credit card of the user to a mobile device of the user. The credit card may include circuitry, such as location tracking circuitry, for communicating a location of the credit card to a remote electronic recipient, such as a global positioning system, for example. Information about the location of the credit card, and the pairing between the credit card and a mobile device may be communicated over a communication network, for example, to a financial institution, such as a bank, which may remotely decide whether to approve or deny the use of the credit card by a user.

FIG. 1 depicts an exemplary system 100 for authorizing a use of a credit card by a user, in accordance with one or more embodiments of the present disclosure. System 100 may include a server 101, a mobile device 160, a credit card 110 with circuitry 113 disposed therein, and a (client) point-of-sale (POS) terminal 195, all communicating 103 over a communication network 105. When a credit card user attempts to use a credit card, a financial institution, typically the credit card company issuing the credit card to the user, may remotely assess via communication network 105 whether the user using the credit card is the authorized user in order to approve the transaction. One or more of the embodiments taught herein leverage the fact that the user of the credit card may most likely carry or is near to the user's mobile device, such as a cellphone, tablet, wearable or smartphone, for example, and may use the proximity of the user's mobile device to the credit card as a part of the authentication process for authorizing the user to use the credit card to purchase goods or services.

In some embodiments, credit card 110 may include circuitry 113 capable of communicating 132 a location of the credit card with a remote electronic recipient 107. Remote electronic recipient 107 may include a satellite of a global positioning system (GPS), a number of communication base stations for location assessment, for example, by using triangularization techniques, and the like for determining the location of the credit card.

Server 101 may include a processor 102 and a memory, such as random-access memory (RAM) 104. Server 101 may be operated by the financial institution issuing the credit card, and/or by any transaction clearing house used for authorizing the credit card for use.

Credit card 110 may be formed from plastic, metal, or any other suitable material. Credit card 110 may include credit card (CC) circuitry 113 formed directly therein, and/or disposed therein by gluing, bonding or by any suitable adhesion method for affixing circuitry to the material of credit card 110. CC circuitry 113 may be configured to utilize any hardwired circuitry. CC circuitry 113 may be implemented as one or more integrated circuit chips, and/or electronic devices, electrically interconnected and bonded to a circuit board, for example.

Credit card (CC) circuitry 113 may include a memory 120, a processor 125, location tracking circuitry 130, such as a location tracking chip, authentication circuitry 135, communication circuitry and interface 140, and a power source 145. Memory 120 may store code, such as a CC authentication module 127, that when executed by processor 125 may cause processor 125 to implement proximity multi-factor authentication, or any suitable authentication scheme in pairing with mobile device 160 to verify if a user of credit card 113 is an authorized user of the credit card so as to approve the transaction when the user attempts to use the credit card to purchase goods and/or services at POS terminal 195.

In some embodiments, power source 145 may be used to power credit card circuitry 113. Power source 145 may include, for example, a battery, a solar cell, and/or any suitable energy harvesting device, capable of generating enough power for powering CC circuitry 113. In other embodiments, the credit card may be powered upon swiping or inserted the credit card into a slot in POS terminal 195 such that the power source may be POS terminal 195 itself or any other device into which the credit card is swiped or inserted. Once powered, the credit card and/or POS terminal 195, may communicate a location of the credit card with the remote electronic recipient.

Location tracking circuitry 130 may include a location tracking chip, for example, which may communicate the location of credit card 110 to a GPS system via satellite 107. Location tracking circuitry 130 may be configured to ping the location of the credit card repeatedly or in predefined time intervals, such as every 5 seconds, for example. In other embodiments, the location of the credit card and/or the proximity of the credit card to the mobile device may be communicated to mobile device circuitry that may be configured to relay the location and/or pairing information to server 101 and/or to use the credit card location in the authentication schemes for authorizing the credit card for use by the user.

Mobile device 160 may include mobile device circuitry 165. Mobile device circuitry 165 may include a mobile device (MD) processor 170, a memory, such as RAM 180, communication circuitry and interface 185, and any input and/or output device, such as a touchscreen display 190. RAM 180 may store code, such as an MD authentication module 175, and/or a location application 176 that when executed by processor 170 may cause processor 170 to implement proximity multi-factor authentication, or any authentication scheme in pairing with credit card 110 (e.g., credit card circuitry 113) to verify if a user of credit card 113 is an authorized user of the credit card. In some embodiments, any credit card application running on mobile device 160, such as an application supplied by the financial institution issuing the credit card and/or managing the transactions of the credit card user, may include MD authentication module 175 and/or location application 176 that may relay information back to the financial institution (e.g., server 101).

The various embodiments of system 100 taught in FIG. 1 and in the following figures solve the technical problem of ensuring that a credit card's use may be performed with the authorized user of the credit card, such as by the credit card's account owner. System 100 may use location tracking of the credit card. The location of the credit card as well as the location of the credit card relative to the mobile device may be used in the authentication process during the pairing of credit card 110 with mobile device 160 when implementing proximity multi-factor authentication (MFA) schemes, for example to authorize the card for use by the user. In other embodiments, the authentication schemes and/or proximity information related to the successful pairing of the credit card and the mobile device may be relayed back to server 101 (e.g., server processor 102) so as to approve transactions for purchasing goods and/or services with the authorized user's credit card.

In some embodiments, an initial authentication for pairing the credit card with the mobile device may be implemented by the user contacting the financial institution from the user's mobile device to initially authorize the pairing of credit card 110 with mobile device 160 so as to receive pairing approval. In other embodiments, the pairing and/or unpair processes between the credit card and the mobile device may occur automatically and seamlessly such as without any action on the part of the user, particularly if the same mobile device had been previously paired with the same credit card in the past. In yet other embodiments, proximity MFA may use biometrics (e.g., fingerprint, voice recognition, etc.) and/or a password entered by the user and/or a swiping of the mobile device screen by a finger of the user and/or the proximity of the credit card to the mobile device or any client device, for example, to pair or unpair the credit card with the client.

In some embodiments, server processor 101 may control a credit card application including authentication module 175 and/or location application 176 operating on mobile device 160 via communication network 105 so as to display the location of credit card 110 and/or the authentication status of the credit card to the user on display 190 (e.g., via an application running on mobile device 160).

In some embodiments, when the credit card may include a battery as power source 145, the credit card and the mobile device may be configured to pair with the credit card on the fly when the credit card is used during a transaction, so as to conserve power stored in the battery.

In some embodiments, if the credit card is detected to be used by an unauthorized user at POS terminal 195 using the embodiments taught herein, the merchant using POS terminal 195, for example, may receive an alarm or alert that the user is unauthorized (e.g., an alert on a display of POS terminal 195).

Figure 2:
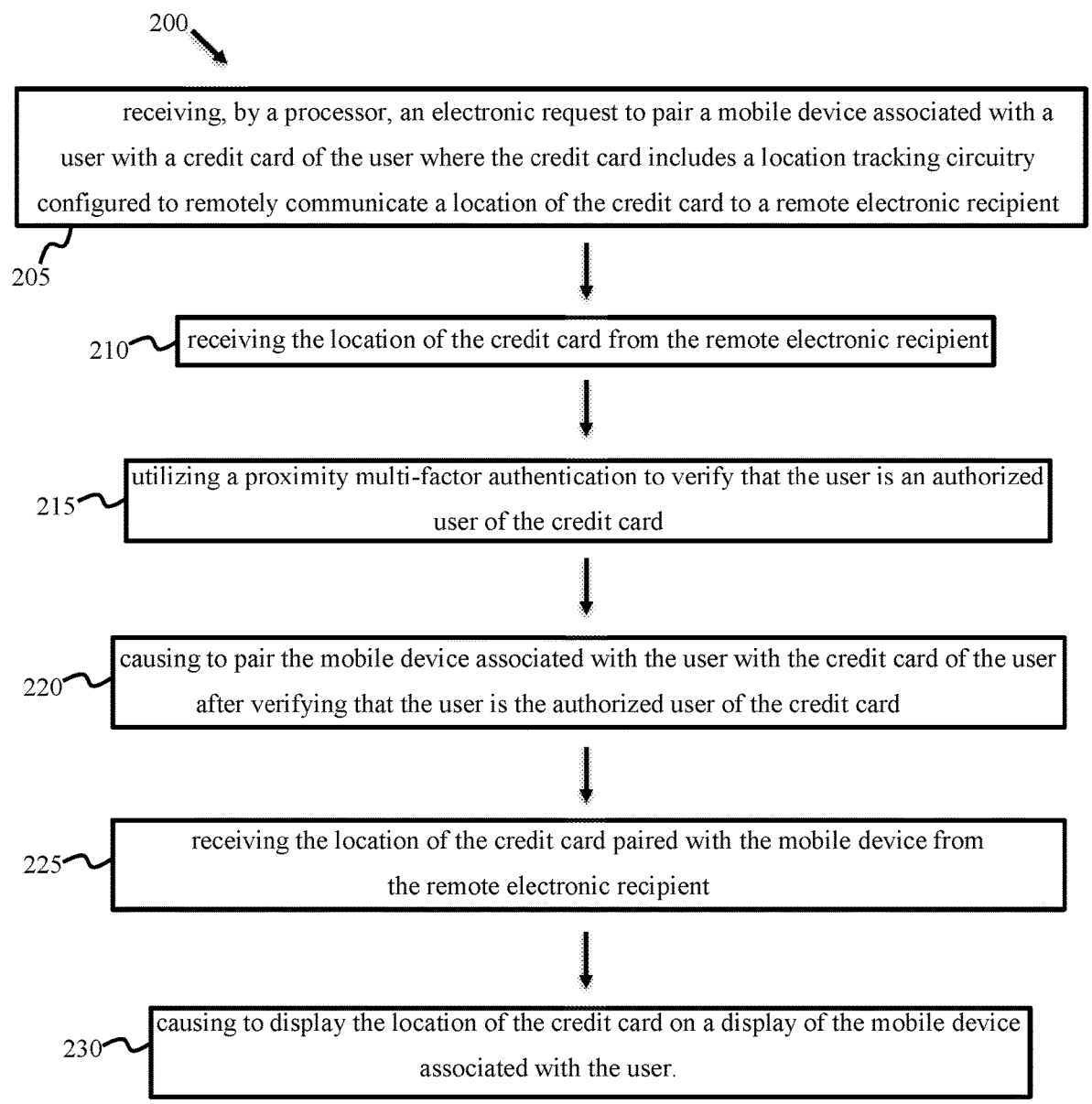
FIG. 2 illustrates a flowchart of an exemplary method for authenticating if a credit card user is an authorized user by pairing the credit card with a mobile device, in accordance with one or more embodiments of the present disclosure.

FIG. 2 illustrates a flowchart of an exemplary method 200 for authenticating if a credit card user is an authorized user by pairing the credit card with a mobile device, in accordance with one or more embodiments of the present disclosure. Method 200 may be implemented by server processor 102 or by processor 170 of mobile device 160.

Method 200 may include receiving 205 an electronic request to pair a mobile device associated with a user with a credit card of the user, where the credit card includes a location tracking circuitry that is configured to remotely communicate a location of the credit card to a remote electronic recipient. Method 200 may include receiving 210 the location of the credit card from the remote electronic recipient.

Method 200 may include utilizing 215 a proximity multi-factor authentication to verify that the user is an authorized user of the credit card, such as by using the location of credit card 110. Method 200 may include causing 220 to pair the mobile device associated with the user with the credit card of the user after verifying that the user is the authorized user of the credit card. Method 200 may include receiving 225 the location of the credit card paired with the mobile device from the remote electronic recipient. Method 200 may include causing 230 to display the location of the credit card on a display of the mobile device associated with the user.

In other embodiments, method 200 may include determining whether the location of the credit card is outside of a predefined geographical area, and deactivating the credit card for use when the location of the credit card is outside of the predefined geographical area.

Figure 3:
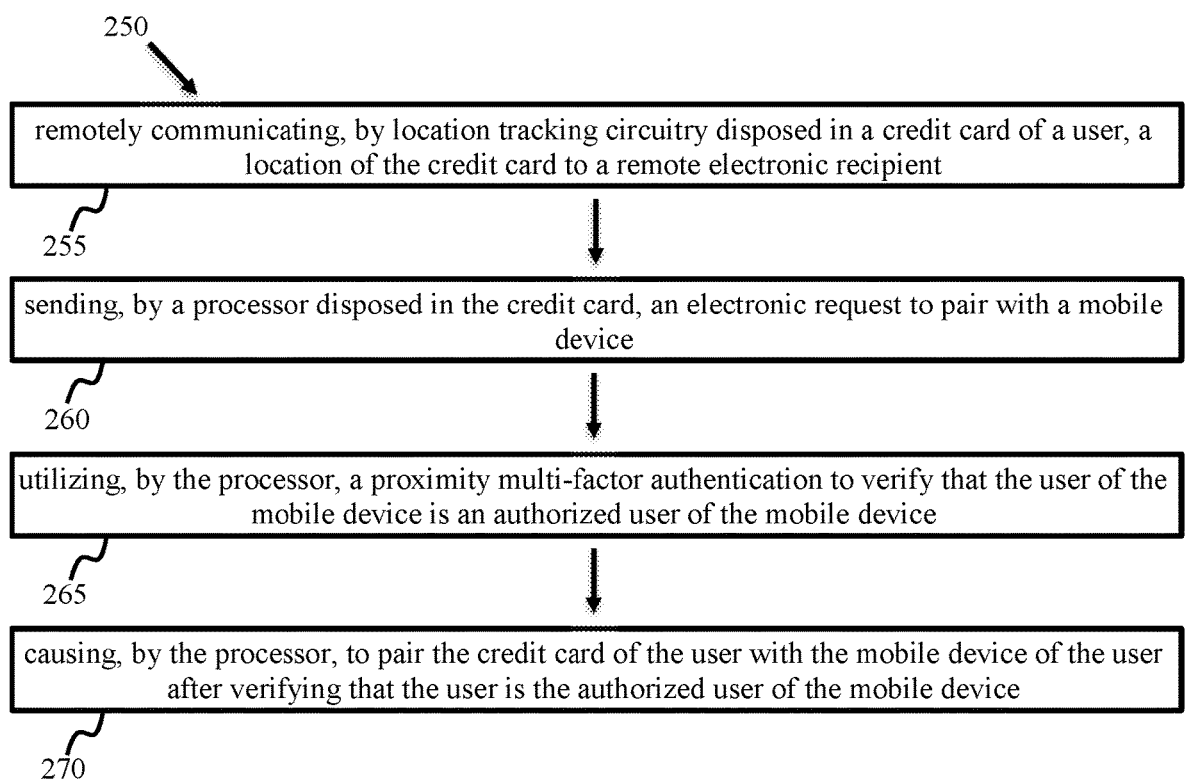
FIG. 3 illustrates a flowchart of an exemplary method for authenticating if a mobile device user is an authorized user by pairing the credit card with a mobile device, in accordance with one or more embodiments of the present disclosure.

FIG. 3 illustrates a flowchart of an exemplary method 250 for authenticating if a mobile device user is an authorized user by pairing the credit card with a mobile device, in accordance with one or more embodiments of the present disclosure. Method 250 may include remotely communicating 155, by location tracking circuitry 130 disposed in credit card 110 of a user, a location of the credit card to a remote electronic recipient, such as satellite 107 of a GPS system.

Method 250 may include sending 260, implemented by processor 125 disposed in credit card circuitry 113 of credit card 110, an electronic request to pair with a mobile device. Method 250 may include utilizing 265 by processor 125 a proximity multi-factor authentication to verify that the user of the mobile device is an authorized user of the mobile device. Method 250 may include causing 270 by processor 125 to pair the credit card of the user with the mobile device of the user after verifying that the user is the authorized user of the mobile device.

In other embodiments, method 250 may include determining whether the location of the credit card is outside of a predefined geographical area, and deactivating the credit card for use when the location of the credit card is outside of the predefined geographical area.

Figure 4:
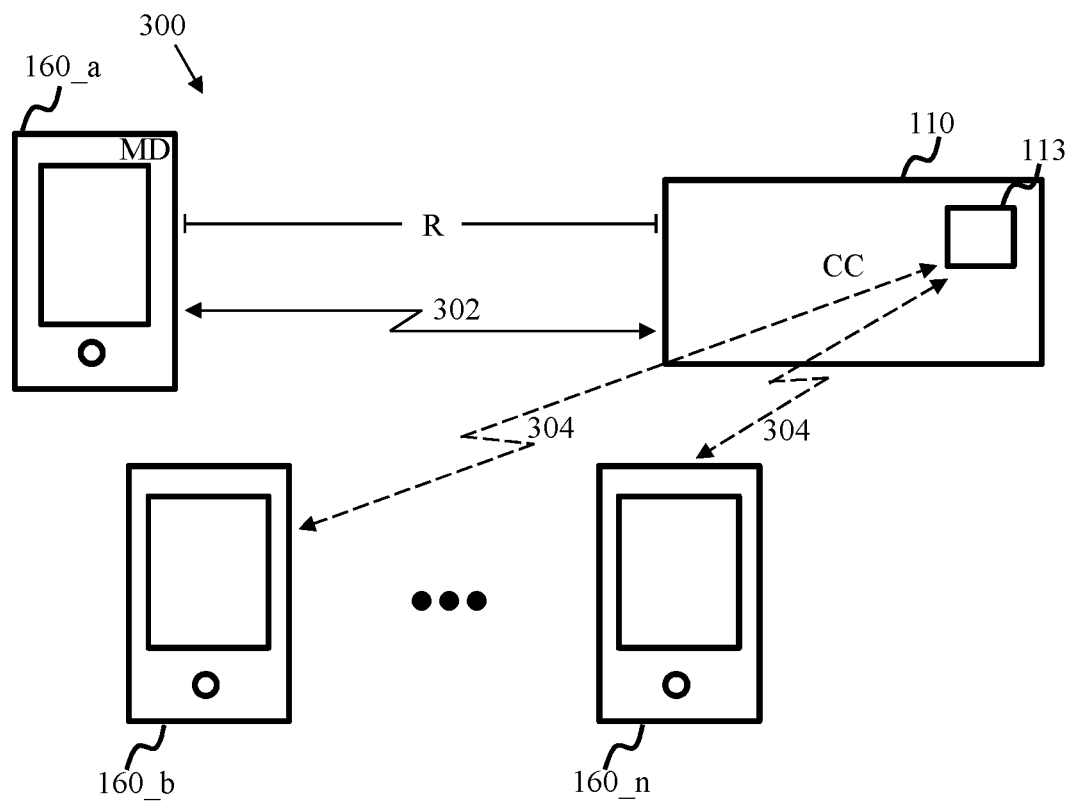
FIG. 4 is a block diagram of a system for activating a credit card when pairing a credit card with a mobile device, in accordance with one or more embodiments of the present disclosure.

FIG. 4 is a block diagram of a system 300 for activating a credit card when pairing credit card 110 with mobile device 160, in accordance with one or more embodiments of the present disclosure. The user typically carries the user's mobile device. In this exemplary embodiment, to activate a credit card for use by an authorized user, communication circuitry 140 of credit card 110 may search for a mobile device 160 that the user has previously paired with (e.g., the user's mobile device) in a region where one or more mobile devices, denoted 160_a, 160_b, . . . 160_n, are located for n mobile devices where n is an integer.

Although credit card 110 may detect the multiple mobile devices in the vicinity, only mobile device 160_a of the authorized user may pair 302 with credit card 110 whereas the other mobile devices are unable to pair 304 with credit card 110. In some embodiments, the pairing between mobile device 160_a and credit card 110 may be the result of the user initiating a new multi-factor authentication (MFA) process, or that the respective processors of the mobile device and/or the credit card may automatically allow pairing since the mobile device and the credit card may have been previously paired.

In some embodiments, when server processor 101 may detect that credit card 110 and mobile device 160 have paired, server processor 101 may authorize credit card 110 for use by the user. In other embodiments, server processor 101 may detect that the credit card and mobile device have paired. However, in order to authorize the credit card for user by the user, system processor may need to assess that the distance or range R as shown in FIG. 4 between credit card 110 and paired mobile device 160_a may be less than a predefined range or value. If the range R is greater than the predefined range value, server processor 101 may deactivate credit card 110 for use. The predefined range may be three meters, for example. In some embodiments, the predefined range may be customizable. In yet other embodiments, the predefined range may be determined by the maximum distance that the credit card and mobile device are able to pair with one another.

In some embodiments, a credit card application operating on mobile device 160 may detect that the credit card location moves just outside of the predefined range. This may occur in an exemplary scenario where the user is in a restaurant sitting on one side of the restaurant and hands the waiter the credit card to pay the bill. The waiter takes the credit card to swipe at POS terminal 195 located at the other side of the restaurant where range R is just outside of the predefined range, and the credit card becomes unauthorized for use. In this exemplary scenario, a credit card application operating on mobile device 160 may be configured to alert the user to the transaction attempt by the waiter, such as in a pop-up window on display 190, for example. The alert may display the location (e.g., the restaurant name) and the amount of the transaction attempt. The credit card application may allow the user to approve the transaction made by the waiter (e.g., by the user pushing a button in a pop-up window appearing in the user's mobile device display).

In some embodiments, credit card 110 and mobile device 160 may be unable to communicate with server 101 and/or satellite 107 over communication network 105, for example, when the user is underground in a subway station. Yet, in this exemplary scenario, mobile device and credit card 110 are still able to pair with one another. If the user tries to use the credit card in POS terminal 195 while underground, MD authentication module 175 operating in mobile device 160 and/or CC authentication module 127 operating in credit card circuitry 113 alone or in tandem may locally authorize a transaction by the credit user when the mobile device and credit card are paired.

Figure 5:
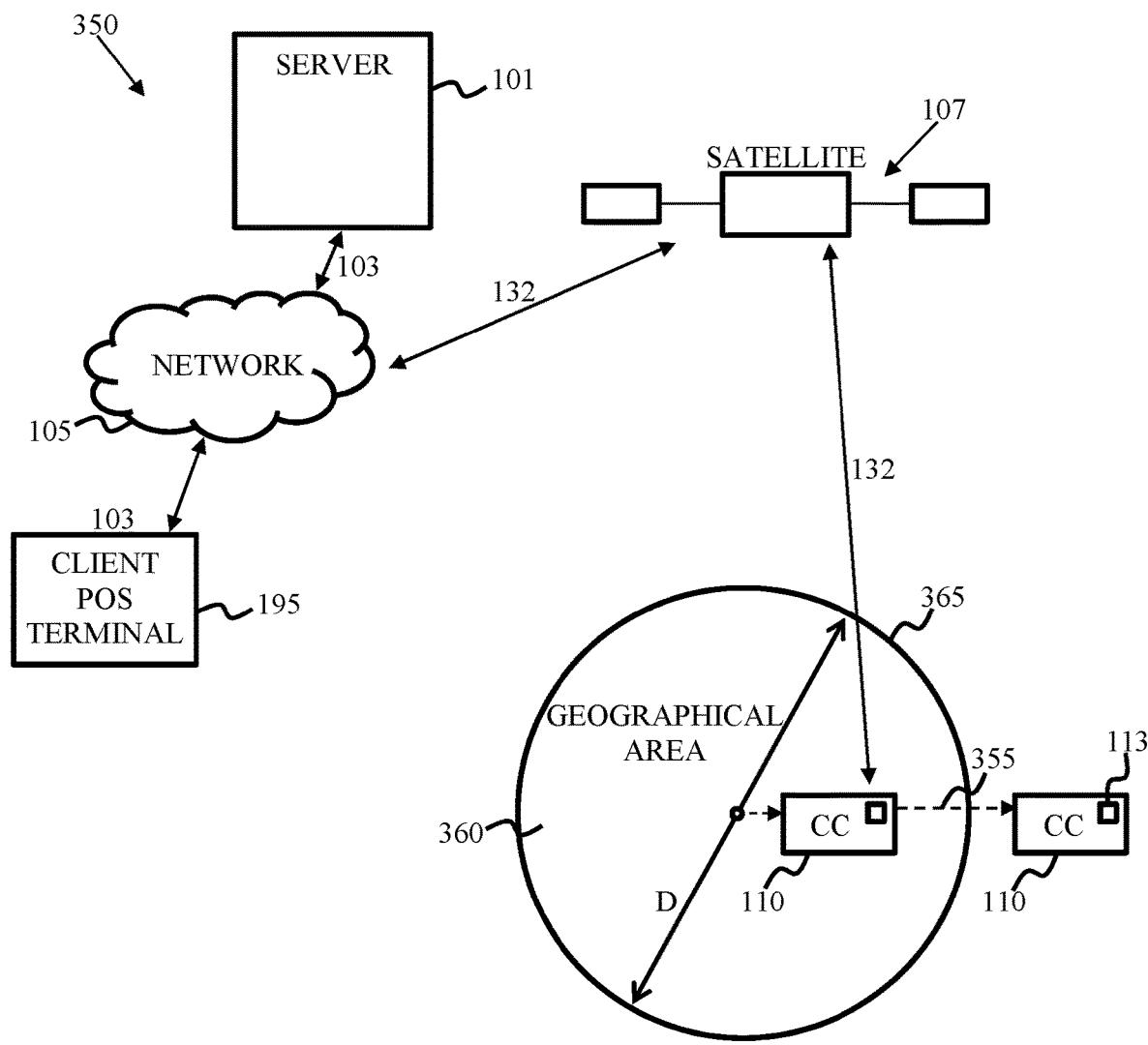
FIG. 5 is a block diagram of a system for activating a credit card when detecting that a credit card is within a predefined geographic area, in accordance with one or more embodiments of the present disclosure.

FIG. 5 is a block diagram of a system 350 for activating a credit card when detecting that credit card 110 is within a predefined geographic area, in accordance with one or more embodiments of the present disclosure. When processor 102 of server 101 and/or processor 125 of credit card circuitry 113 may detect that credit card 110 is within a geographical area 360 (e.g., as shown, for example, in a geometric area bounded by a circle 365 of a diameter D), credit card 110 may be activated for use by an authorized user.

However, in the event that location tracking circuitry 130 reports to processor 102 and/or processor 125 that credit card 110 has left geographic area 360 (e.g., as shown by an arrow 355), authentication module 175, authentication circuitry 135 (e.g., hardware) and/or authentication module 127 (e.g., software) may deactivate credit card 110 for use. In exemplary scenarios, if geographic area 360 is New York City, and the card is mailed to the user at an address in New York City but the credit card mistakenly arrives to Philadelphia by the mail carrier, the credit card may be deactivated. If a thief steals credit card 110 from the user in New York City and takes it to Los Angeles, e.g. outside of geographical area 360, the credit card may be automatically deactivated.

In some embodiments, the credit card may be deactivated permanently. In other embodiments, the credit card may be deactivated for use temporarily when the location of the credit card is detected to be outside geographic area 360, and then reactivated for use when the location of the credit card is detected as having returned within geographic area 360. In this case, credit card 110 once inside geographic area 360 may still need to be paired with mobile device 160 in order to be authorized for use in user transactions.

In some embodiments, credit card 110 may include tamper-proof capabilities. For example, if the pairing device (e.g., circuitry 113) of credit card 110 was tampered and/or removed, for example, authentication circuitry 135 (e.g., hardware) and/or authentication module 127 (e.g., software)

may permanently deactivate the credit card for use by the user, such that a thief or a criminal may not simply remove the pairing device. In other embodiments, if the pairing device (e.g., circuitry 113) was altered in any way by a thief or a criminal, so as to cause the credit card to search for another mobile device to pair with, authentication circuitry 135 (e.g., hardware) and/or authentication module 127 (e.g., software) may permanently deactivate the credit card for use by the user. Device pairing between the credit card and the user's mobile device may be changed, for example, through the user's mobile device and not through credit card circuitry tampering. Similarly, the tamper-proof capabilities described hereinabove may also prevent the thief or criminal from circumventing deactivation if credit card 110 is moved outside of geographical area 360 as described in FIG. 5.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other. Note that any of the above-mentioned data communication schemes may be used to communicate the location of credit card 110 and/or to pair 162 credit card 110 with mobile device 160 and/or to communicate to server 101 information about the pairing and/or location of credit card 110 relative to mobile device 160.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet, smart television, etc.), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) iOS; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35) .NET Framework; (36) Silverlight; (37) Open Web Platform; (38) Oracle Database; (39) Qt; (40) SAP NetWeaver; (41) Smartface; (42) Vexi; and (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users that may be, but not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-99,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, a virtually generated display, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, wearable or any other reasonable mobile electronic device.

As used herein, terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation. In some embodiments, credit card circuitry 113 may include RFID tags.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIP-EMD-160, RTR0, SHA-1, SHA-2, Tiger (TTH), WHIRLPOOL, RNGs, etc.).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

Figure 6:
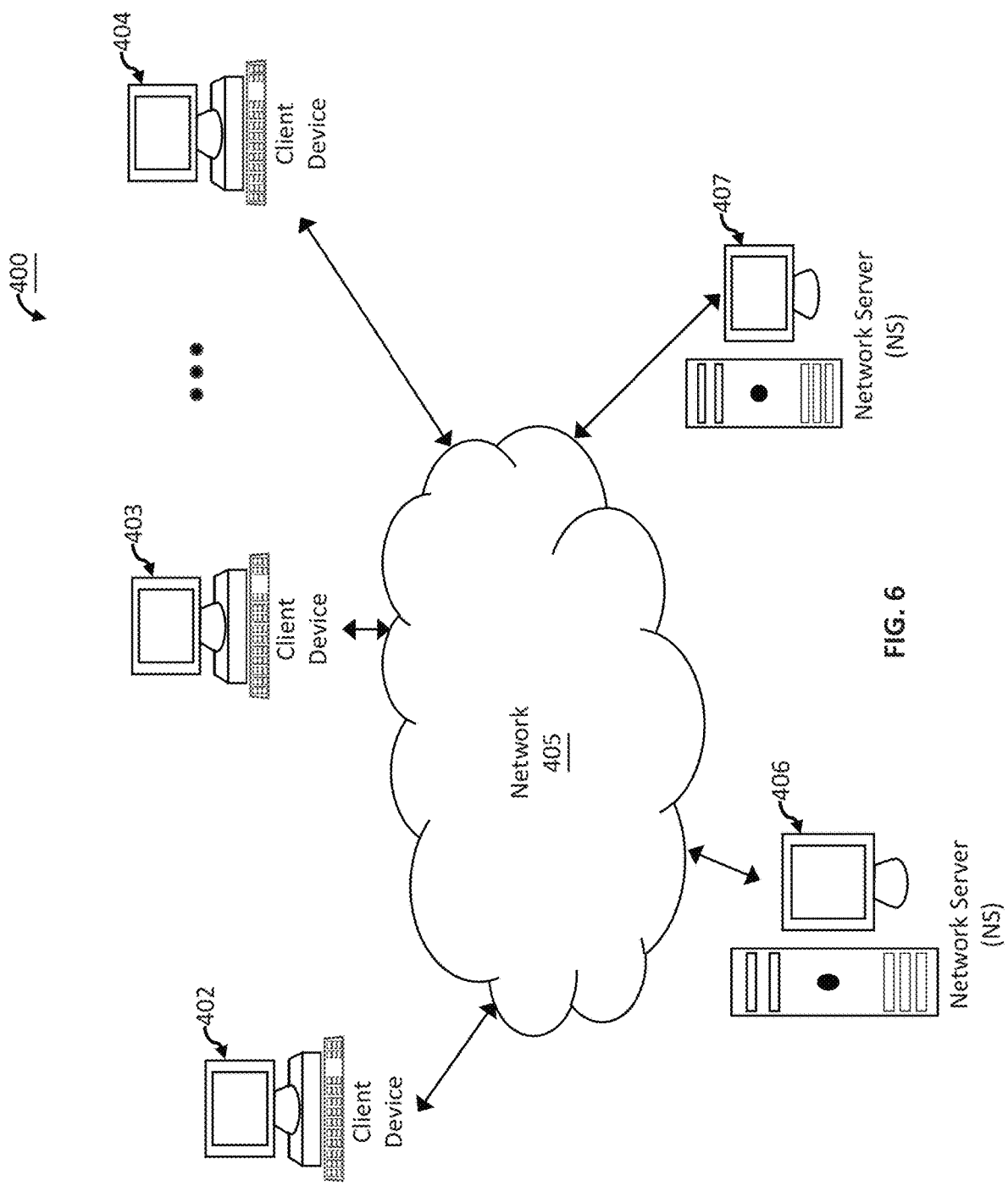
FIG. 6 depicts a block diagram of an exemplary computer-based system/platform in accordance with one or more embodiments of the present disclosure.

FIG. 6 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to manage a large number of members and/or concurrent transactions, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 6, members 402-404 (e.g., clients) of the exemplary computer-based system/platform 400 may include virtually any computing device capable of receiving and sending a message over a network (e.g., cloud network), such as network 105, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine-readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 6, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 7:
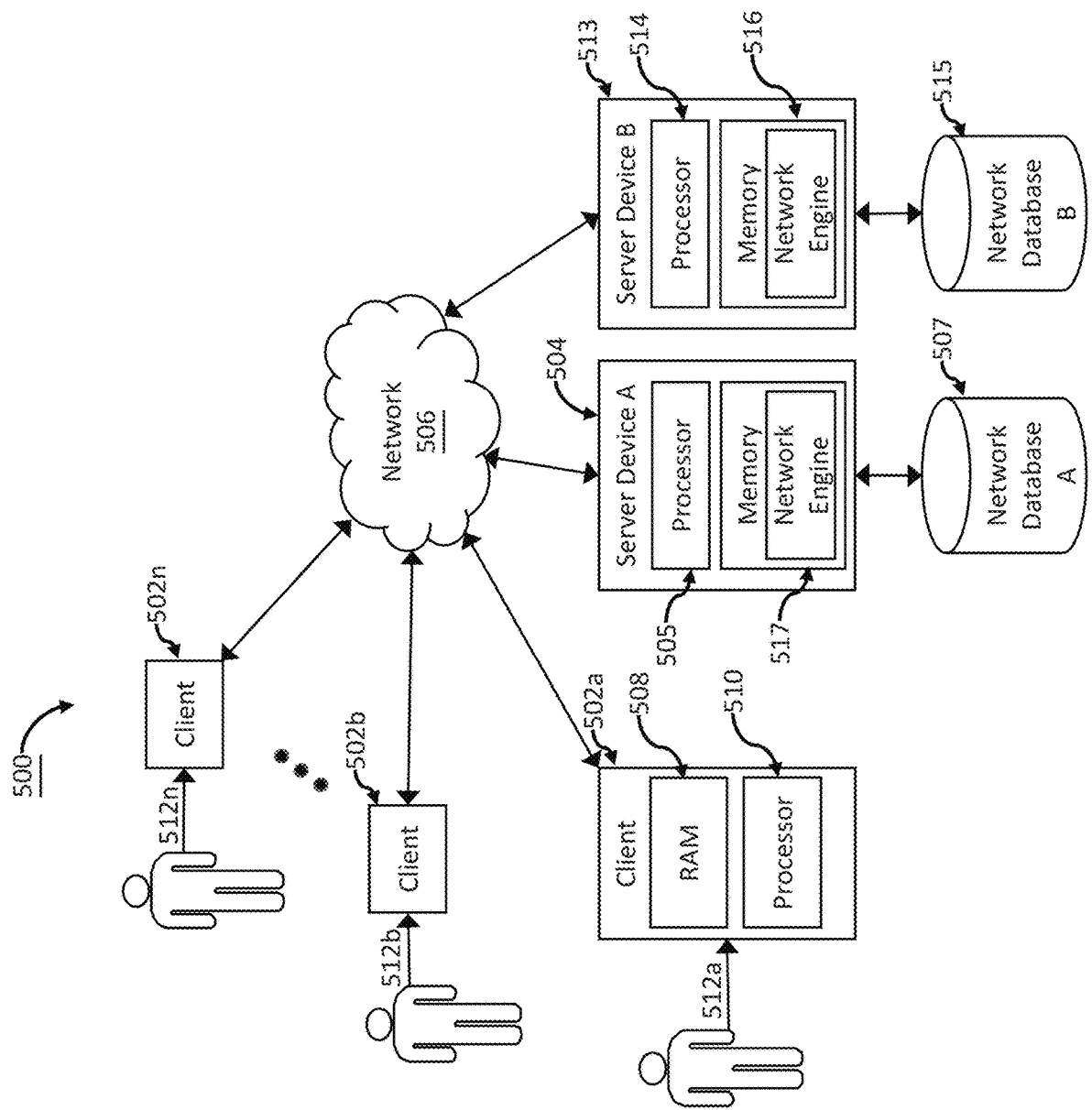
FIG. 7 depicts a block diagram of another exemplary computer-based system/platform in accordance with one or more embodiments of the present disclosure.

FIG. 7 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502*a*, 502*b* thru 502*n* shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502*a*, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, etc.

In some embodiments, member computing devices 502*a* thru 502*n* may also comprise a number of external or internal devices such as a mouse, a CD-ROM, DVD, a physical or virtual keyboard, a display, a speaker, or other input or output devices. In some embodiments, examples of member computing devices 502*a* thru 502*n* (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502*a* thru 502*n* may be specifically programmed with one or more application programs in accordance with one or more principles/methodologies detailed herein. In some embodiments, member computing devices 502*a* thru 502*n* may operate on any operating system capable of supporting a browser or browser-enabled application, such as Microsoft™, Windows™, and/or Linux. In some embodiments, member computing devices 502*a* thru 502*n* shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502*a* thru 502*n*, users 512*a* through 512*n*, for example, may communicate over the exemplary network 506 with each other and/or with other systems and/or devices coupled to the network 506. As shown in FIG. 7, exemplary server devices 504 and 513 may be also coupled to the network 506. In some embodiments, one or more member computing devices 502*a* thru 502*n* may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 8:
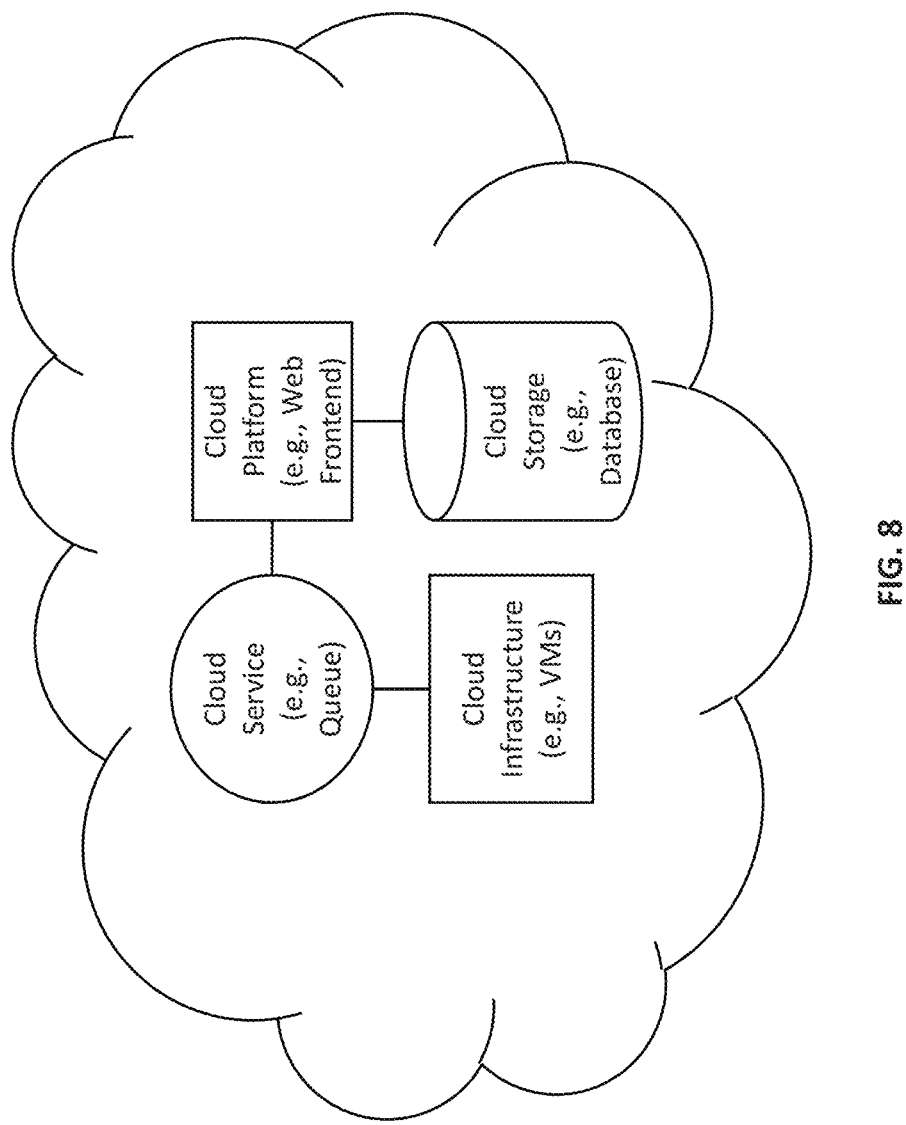
FIGS. 8 and 9 are diagrams illustrating implementations of cloud computing architecture/aspects with respect to which the disclosed technology may be specifically configured to operate, in accordance with one or more embodiments of the present disclosure.
Figure 9:
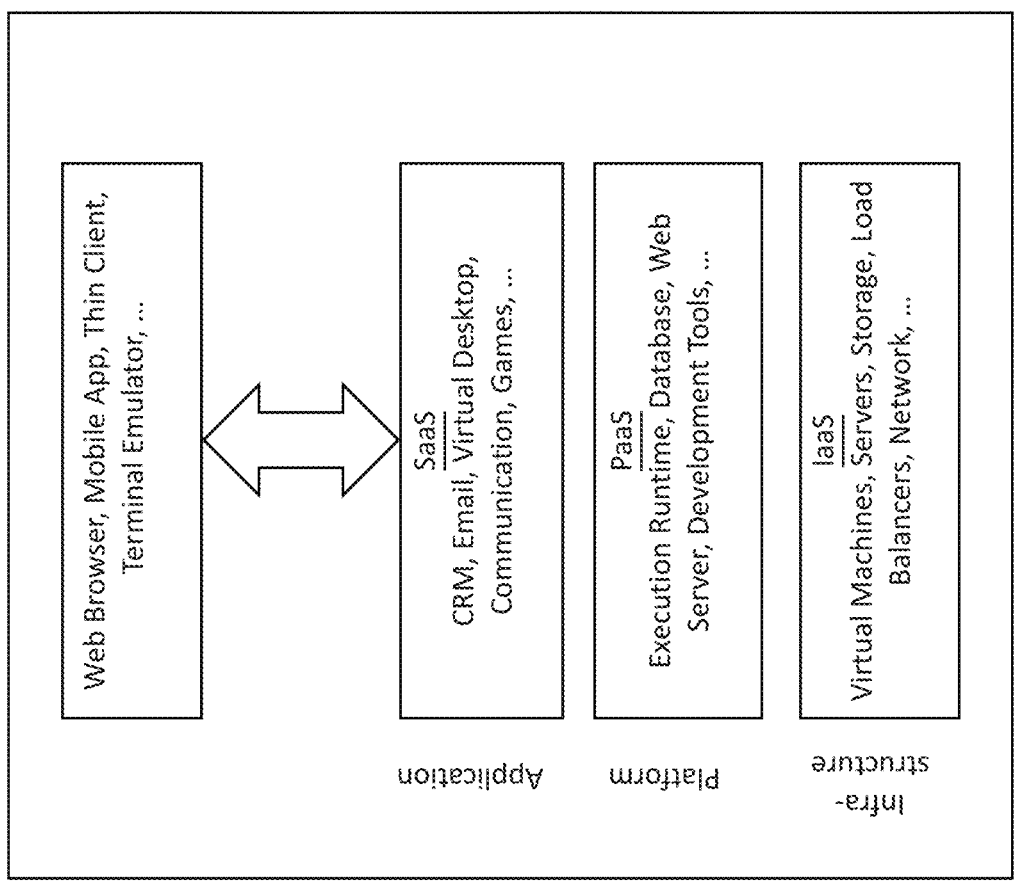

In some embodiments, the exemplary inventive computer-based systems/platforms, the exemplary inventive computer-based devices, and/or the exemplary inventive computer-based components of the present disclosure may be specifically configured to operate in an cloud computing/architecture such as, but not limiting to: infrastructure a service (IaaS), platform as a service (PaaS), and/or software as a service (SaaS). FIGS. 8 and 9 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

In some embodiments, server 101 as shown in FIG. 1 may be equivalent to network servers 406 and 407 of FIG. 6 and servers 504 and 513 of FIG. 7. Server 101 may be a cloud server providing with cloud services as shown FIGS. 8 and 9 used for authorizing a credit card for use by a user in accordance with the embodiments taught herein above. Similarly, mobile device 160 may be represented as one or more client devices 402, 403 and 404 in FIG. 6 and/or client devices 502a, 502b, . . . , 502n of FIG. 7.

In some embodiments, a method may include receiving, by a processor, an electronic request to pair a mobile device associated with a user with a credit card of the user, where the credit card may include a location tracking circuitry that is configured to remotely communicate a location of the credit card to a remote electronic recipient. The location of the credit card may be received by the processor from the remote electronic recipient. A proximity multi-factor authentication may be utilized by the processor to verify that the user is an authorized user of the credit card. The processor may cause the mobile device associated with the user to pair with the credit card of the user after verifying that the user is the authorized user of the credit card. The processor may receive the location of the credit card paired with the mobile device from the remote electronic recipient. The processor may cause the location of the credit card to be displayed on a display of the mobile device associated with the user.

In some embodiments, the method may include determining, by the processor, whether the location of the credit card is outside of a predefined geographical area, and deactivating, by the processor, the credit card for use when the location of the credit card is outside of the predefined geographical area.

In some embodiments, a method may include remotely communicating, by location tracking circuitry disposed in a credit card of a user, a location of the credit card to a remote electronic recipient. A processor disposed in the credit card may send an electronic request to pair with a mobile device. The processor may utilize a proximity multi-factor authentication to verify that the user of the mobile device is an authorized user of the mobile device. The processor may cause the credit card of the user to pair with the mobile device of the user after verifying that the user is the authorized user of the mobile device.

In some embodiments, the method may include determining, by the processor, whether the location of the credit card is outside of a predefined geographical area; and deactivating the credit card for use when the location of the credit card is outside of the predefined geographical area.

In some embodiments, a system may include a memory and at least one processor. The at least one processor may be configured to:

receive an electronic request to pair a mobile device associated with a user with a credit card of the user, wherein the credit card comprises a location tracking circuitry that is configured to remotely communicate a location of the credit card to a remote electronic recipient, receive the location of the credit card from the remote electronic recipient, utilize a proximity multi-factor authentication to verify that the user is an authorized user of the credit card, cause to pair the mobile device associated with the user with the credit card of the user after verifying that the user is the authorized user of the credit card, receive the location of the credit card paired with the mobile device from the remote electronic recipient, and cause to display the location of the credit card on a display of the mobile device associated with the user.

In some embodiments, the processor may be configured to determine whether the location of the credit card is outside of a predefined geographical area, and to deactivate the credit card for use when the location of the credit card is outside of the predefined geographical area.

A credit card may include a processor and location tracking circuitry configured to remotely communicate a location of the credit card of a user to a remote electronic recipient. The processor may be configured to:

send an electronic request to pair with a mobile device, utilize a proximity multi-factor authentication to verify that the user of the mobile device is an authorized user of the mobile device, and cause to pair the credit card of the user with the mobile device of the user after verifying that the user is the authorized user of the mobile device.

In some embodiments, the processor may be configured to determine whether the location of the credit card is outside of a predefined geographical area, and to deactivate the credit card for use when the location of the credit card is outside of the predefined geographical area.

In some embodiments, a method may include:

receiving, by a processor, an electronic request to pair a mobile device associated with a user with a credit card of the user;

where the credit card includes a location tracking circuitry that is configured to remotely communicate a location of the credit card to a remote electronic recipient;

receiving, by the processor, the location of the credit card from the remote electronic recipient;

utilizing, by the processor, a proximity multi-factor authentication to verify that the user is an authorized user of the credit card;

causing, by the processor, to pair the mobile device associated with the user with the credit card of the user after verifying that the user is the authorized user of the credit card;

receiving, by the processor, the location of the credit card paired with the mobile device from the remote electronic recipient;

causing, by the processor, to display the location of the credit card on a display of the mobile device associated with the user;

determining, by the processor, whether the location of the credit card is outside of a predefined geographical area; and deactivating, by the processor, the credit card for use when the location of the credit card is outside of the predefined geographical area.

In some embodiments, the remote electronic recipient may be a global positioning system (GPS).

In some embodiments, the method may include relaying, by the processor, an alert to a merchant over the communication network that the credit card was deactivated.

In some embodiments, the method may include deactivating, by the processor, the credit card for use by the user when the credit card does not pair with any mobile device.

In some embodiments, the method may include deactivating, by the processor, the credit card for use by the user when the location of the credit card is outside of a predefined range from the mobile device.

In some embodiments, the predefined range may be 3 meters.

In some embodiments, the method may include alerting the user on a display of the mobile device that the credit card is deactivated.

In some embodiments, the method may include allowing the user to authorize the credit card for use on the display in response to the alert.

In some embodiments, utilizing the proximity multi-factor authentication may include initially authenticating the credit card and the mobile device of the user for pairing when the user contacts a financial institution from the mobile device to request pairing approval.

In some embodiments, causing, by the processor, to pair with the mobile device may include automatically pairing the mobile device and the credit card after the mobile device received the pairing approval.

In some embodiments, a system may include a memory and at least one processor. The at least one processor may be configured to:

receive an electronic request to pair a mobile device associated with a user with a credit card of the user, wherein the credit card comprises a location tracking circuitry that is configured to remotely communicate a location of the credit card to a remote electronic recipient, receive the location of the credit card from the remote electronic recipient, utilize a proximity multi-factor authentication to verify that the user is an authorized user of the credit card, cause to pair the mobile device associated with the user with the credit card of the user after verifying that the user is the authorized user of the credit card, receive the location of the credit card paired with the mobile device from the remote electronic recipient, cause to display the location of the credit card on a display of the mobile device associated with the user.

determine whether the location of the credit card is outside of a predefined geographical area, and deactivate the credit card for use when the location of the credit card is outside of the predefined geographical area.

In some embodiments, the at least one processor may include one of a processor of a server of a financial institution, or a processor of the mobile device communicating with the server over the communication network.

In some embodiments, the system may include a point-of-sale (POS) terminal associated with a merchant. The processor may be configured to relay an alert to a merchant on the POS terminal that the credit card was deactivated.

In some embodiments, a credit card may include a processor and location tracking circuitry configured to remotely communicate a location of the credit card of a user to a remote electronic recipient. The processor may be configured to:

send an electronic request to pair with a mobile device, utilize a proximity multi-factor authentication to verify that the user of the mobile device is an authorized user of the mobile device, cause to pair the credit card of the user with the mobile device of the user after verifying that the user is the authorized user of the mobile device, determine whether the location of the credit card is outside of a predefined geographical area, and deactivate the credit card for use when the location of the credit card is outside of the predefined geographical area.

In some embodiments, the processor may be configured to deactivate the credit card for use by the user when the credit card does not pair with any mobile device.

In some embodiments, the processor may be configured to deactivate the credit card for use by the user when the location of the credit card is outside of a predefined range from the mobile device.

In some embodiments, the credit card may include a power source for powering the processor and circuitry in the credit card.

In some embodiments, the power source may be selected from the group consisting of a battery, a solar cell, an energy harvesting device, and a point-of-sale (POS) terminal into which the credit card is swiped or inserted.

Any publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A method, comprising:
    receiving, by a server, over a communication network, an electronic request to pair a mobile device associated with a user with a physical credit card of the user;
    wherein the physical credit card comprises a location tracking circuitry disposed within the physical credit card that is configured to remotely communicate a location of the physical credit card to a remote electronic recipient in a communication and a first communication circuitry, disposed within the physical credit card that is configured to remotely communicate with a second communication circuitry disposed within the mobile device;

receiving, by the server, over the communication network, the location of the physical credit card from the remote electronic recipient;

wherein the server, the physical credit card, the remote electronic recipient, and the mobile device communicate over the communication network;

performing, by the server, over the communication network, a proximity multi-factor authentication, utilizing the mobile device, the physical credit card, or both, to verify that the user is an authorized user of the physical credit card;

instructing, by the server, over the communication network, the second communication circuitry of the mobile device associated with the user and the first communication circuitry of the physical credit card to pair to each other when the physical credit card and the mobile device are within a predefined range that the physical credit card and the mobile device are able to pair after verifying that the user is the authorized user of the physical credit card;

receiving, by the server, over the communication network, the location of the physical credit card paired with the mobile device from the remote electronic recipient;

causing, by the server, over the communication network, to display the location of the physical credit card on a display of the mobile device associated with the user;

determining, by the server, over the communication network, the location of the physical credit card with respect to a predefined geographical area based on the communication between the location tracking circuitry disposed within the physical credit card and the remote electronic recipient;

instructing, by the server, over the communication network, the first communication circuitry of the physical credit card to deactivate the physical credit card to perform transactions when the location of the physical credit card is outside of the predefined geographical area based on the communication between the location tracking circuitry disposed within the physical credit card and the remote electronic recipient; and instructing, by the server, over the communication network, the first communication circuitry of the physical credit card to activate the physical credit card to perform transactions when:
1) the location of the physical credit card is inside the predefined geographical area based on the communication between the location tracking circuitry disposed within the physical credit card and the remote electronic recipient, and
2) the physical credit card is paired to the mobile device of the user; and Wherein the physical credit card is programmed to:
(i) make a determination of the location of the physical credit card that the physical credit card is within the predefined geographical area when the first communication circuitry of the physical credit card loses communication with the server over the communication network, and
(ii) remain activated to perform transactions when:
1) the physical credit card is within the predefined geographical area based on the determination of the location of the physical credit card,
2) the first communication circuitry of the physical credit card and the second communication circuitry of the mobile device lose communication with the server over the communication network, and
3) the first communication circuitry of the physical credit card and the second communication circuitry of the mobile device remain paired within the predefined range.

2. The method according to claim 1, wherein the remote electronic recipient is a global positioning system (GPS).

3. The method according to claim 1, further comprising relaying, by the server, an alert to a merchant over the communication network that the physical credit card was deactivated.

4. The method according to claim 1, further comprising deactivating, by the server, over the communication network, the physical credit card for use by the user when the physical credit card does not pair with any mobile device.

5. The method according to claim 1, further comprising deactivating, by the server, over the communication network, the physical credit card for use by the user when the location of the physical credit card is outside of the predefined range for pairing with the mobile device.

6. The method according to claim 5, wherein the predefined range is 3 meters.

7. The method according to claim 5, further comprising alerting, by the server, over the communication network, the user on a display of the mobile device that the physical credit card is deactivated.

8. The method according to claim 7, further comprising authorizing, by the server, over the communication network, the physical credit card for use when the user approves a transaction on the display in response to the alert.

9. The method according to claim 1, wherein the instructing the second communication circuitry of the mobile device and the first communication circuitry of the physical credit card to pair comprises initially authenticating the physical credit card and the mobile device of the user for pairing when the user contacts a financial institution from the mobile device to request pairing approval.

10. The method according to claim 9, wherein the instructing the second communication circuitry of the mobile device and the first communication circuitry of the physical credit card to pair comprises automatically pairing the mobile device and the physical credit card after the mobile device received the pairing approval.

11. A system, comprising:
a physical credit card comprising:
a location tracking circuitry, and
a first communication circuitry;
a server, comprising:
a memory, and
at least one processor configured to:
receive over a communication network, an electronic request to pair a mobile device associated with a user with the physical credit card of the user;
wherein the physical credit card comprises the location tracking circuitry disposed within the physical credit card that is configured to remotely communicate a location of the physical credit card to a remote electronic recipient in a communication and the first communication circuitry disposed within the physical credit card that is configured to remotely communicate with a second communication circuitry disposed within the mobile device;
receive over the communication network, the location of the physical credit card from the remote electronic recipient;

wherein the server, the physical credit card, the remote electronic recipient, and the mobile device communicate over the communication network;

perform over the communication network, a proximity multi-factor authentication, utilizing the mobile device, the physical credit card, or both, to verify that the user is an authorized user of the physical credit card;

instruct over the communication network, the second communication circuitry of the mobile device associated with the user and the first communication circuitry of the physical credit card to pair to each other when the physical credit card and the mobile device are within a predefined range that the physical credit card and the mobile device are able to pair after verifying that the user is the authorized user of the physical credit card;

receive over the communication network, the location of the physical credit card paired with the mobile device from the remote electronic recipient;

cause, over the communication network, to display the location of the physical credit card on a display of the mobile device associated with the user;

determine, over the communication network, the location of the physical credit card with respect to a predefined geographical area based on the communication between the location tracking circuitry disposed within the physical credit card and the remote electronic recipient; and instruct, over the communication network, the first communication circuitry of the physical credit card to deactivate the physical credit card to perform transactions when the location of the physical credit card is outside of the predefined geographical area based on the communication between the location tracking circuitry disposed within the physical credit card and the remote electronic recipient;

instruct, over the communication network, the first communication circuitry of the physical credit card to activate the physical credit card to perform transactions when:
 1) the location of the physical credit card is inside the predefined geographical area based on the communication between the location tracking circuitry disposed within the physical credit card and the remote electronic recipient, and
 2) the physical credit card is paired to the mobile device of the user; and wherein the physical credit card is programmed to:
(i) make a determination of the location of the physical credit card that the physical credit card is within the predefined geographical area when the first communication circuitry of the physical credit card loses communication with the server over the communication network, and (ii) remain activated to perform transactions when:
 1) the physical credit card is within the predefined geographical area based on the determination of the location of the physical credit card,
 2) the first communication circuitry of the physical credit card and the second communication circuitry of the mobile device lose communication with the server over the communication network, and
 3) the first communication circuitry of the physical credit card and the second communication circuitry of the mobile device remain paired within the predefined range.

12. The system according to claim 11, wherein the remote electronic recipient is a global positioning system (GPS).

13. The system according to claim 11, further comprising a point-of-sale (POS) terminal associated with a merchant, and wherein the at least one processor is configured to relay an alert to the POS terminal that the physical credit card was deactivated.

14. The system according to claim 11, wherein the at least one processor is further configured to deactivate over the communication network, the physical credit card for use by the user when the physical credit card does not pair with any mobile device.

15. The system according to claim 11, wherein the at least one processor is further configured to deactivate over the communication network, the physical credit card for use by the user when the location of the physical credit card is outside of the predefined range for pairing with the mobile device.

16. The system according to claim 15, wherein the predefined range is 3 meters.

17. The system according to claim 15, wherein the at least one processor is further configured to alert over the communication network, the user on a display of the mobile device that the physical credit card is deactivated.

18. The system according to claim 17, wherein the at least one processor is further configured to authorize over the communication network, the physical credit card for use when the user approves a transaction on the display in response to the alert.

19. The system according to claim 11, wherein the at least one processor is configured to instruct the second communication circuitry of the mobile device and first the communication circuitry of the physical credit card to pair by initially authenticating the physical credit card and the mobile device of the user for pairing when the user contacts a financial institution from the mobile device to request pairing approval.

20. The system according to claim 19, wherein the at least one processor is configured to instruct the second communication circuitry of the mobile device and the first communication circuitry of the physical credit card to pair by automatically pairing the mobile device and the physical credit card after the mobile device received the pairing approval.

* * * * *